E. H. WRIGHT.
Tire-Tighteners.

No. 153,030.

Patented July 14, 1874.

Witnesses.
John E. Crane
W. H. Ramsdell

Inventor.
Eugene H. Wright

UNITED STATES PATENT OFFICE.

EUGENE H. WRIGHT, OF LOWELL, ASSIGNOR, BY MESNE ASSIGNMENTS, TO HIMSELF AND CHARLES M. CUMMINGS, OF WESTFORD, MASS.

IMPROVEMENT IN TIRE-TIGHTENERS.

Specification forming part of Letters Patent No. 153,030, dated July 14, 1874; application filed April 24, 1874.

*To all whom it may concern:*

Be it known that I, EUGENE H. WRIGHT, of Lowell, in the county of Middlesex and State of Massachusetts, have invented a new and useful Improvement in Carriage-Wheels, of which the following is a full, clear, and exact description, reference being had to the accompanying drawings making part of this specification, in which—

Figure 1:
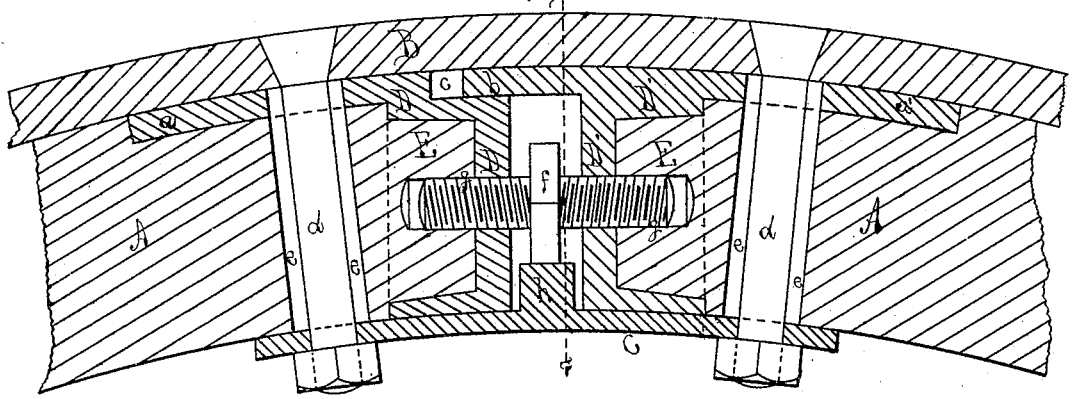
Figure 2:
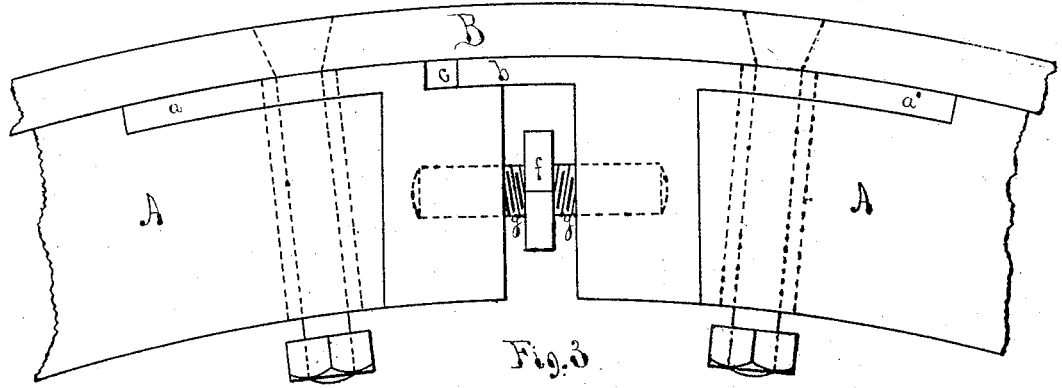
Figure 3:
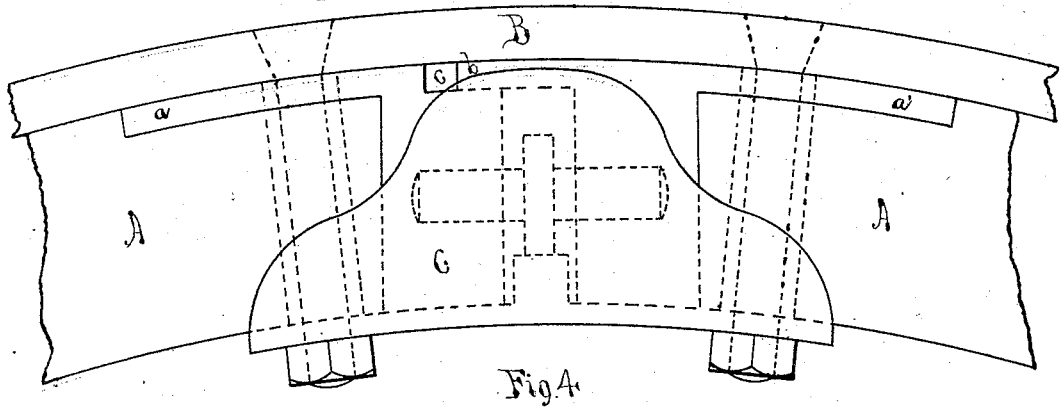
Figure 4:
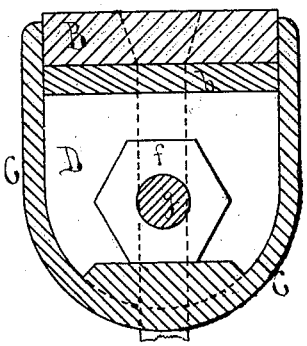

Figure 1 is a central sectional elevation of a portion of the rim of a wheel containing my improvement. Figs. 2 and 3 are side elevations, the latter with a metal cap to cover the joint and connections, and the former with the cap removed. Fig. 4 is a cross-section on the line $a\ b$ of Fig. 1.

This invention relates to and consists of a new and useful improvement in carriage-wheels, and to the new mode or means for holding and retaining the adjusting device in a set position, and in preventing the action of the wheel, when in use, from loosening or disturbing the adjusting mechanism.

In the said drawings, A represents the rim of the wheel, which is generally of wood; and B, the undivided metal tire, as usual. To each end of the rim A I apply a metal connection, D and D', by tenons E formed on the ends of the rim, and entering a socket in each connection. Both connections D have extended outer surfaces $a$ and $a'$, reaching out beneath the tire, and let into the outer surface of the rim A. One of these connections D is halved or rabbeted across its outer surface at $c$, and the opposite connection has an extended flange or projection, $b$, to fit and fill the rabbets $c$, or between this and the inner surface of the undivided tire; thus greatly strengthening the joint, which is further strengthened by an inner cap or cover, C, and by bolts $d$ passing through the undivided tire, the rim A, and the inner plate C, as also through the extended portions $a$ and $a'$. In practice, the rim is slotted, as at $e$, each side of the bolts; so, also, the portions $a$ and $a'$ of the connections; and these slots allow the ends of the rim and the connections to be drawn together or forced outward, and this is done by a right-and-left screw-threaded bolt, $g$, having a center head, $f$, and with the screw ends of the bolt working in screw-threaded holes through the ends of the connections D. The cap C has a center bridge, $h$, to hold the head $f$ of the bolt in position and prevent its turning. The cap C covers the joint and the connections, and protects the parts, and excludes dirt, dust, and mud.

When my improvement is applied to the rim of the carriage-wheel, as shown, and the undivided tire becomes loose by expansion, or by contraction of the wooden rim, the cap C is removed, a wrench applied to the head $f$ of the bolt $g$, and the bolt is turned to force the connections D and the ends of the rim apart, which enlarges the circle of the rim until it fills the undivided tire as close as may be desired, and at the same time the flange $b$ is moved in the rabbet $c$, which retains the firmness and perfection of the joint.

If at any time the wooden wheel-rim swells or expands by too constant use in water, the screw-bolt $g$ is turned the other way, so as to draw the connections and the ends of the rim together, and relieve the pressure of the rim against the inner surface of the undivided tire.

I am aware that a right-and-left screw has been employed in a carriage-wheel for expanding the rim, and also for tightening the divided tire; and I disclaim having invented such device.

I claim as my invention—

The cap C with a center bridge, $h$, in combination with and holding the bolt-head $f$, and the sides of the cap covering the joint and connections, substantially as described.

EUGENE H. WRIGHT.

Witnesses:
JOHN E. CRANE,
W. H. RAMSDELL.